Dec. 27, 1949     A. F. BISCHOFF     2,492,730
ELECTRICAL INDICATING SYSTEM
Filed Feb. 24, 1949
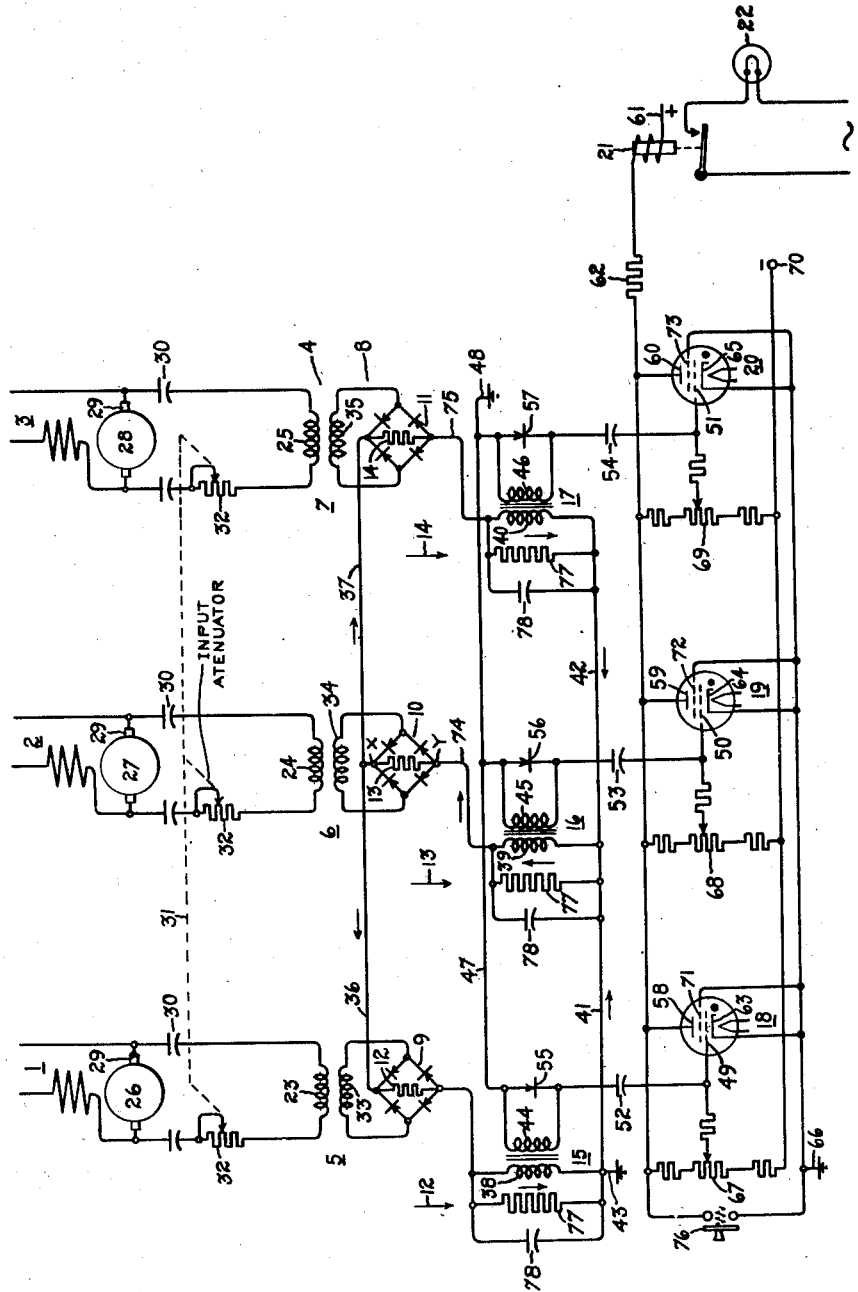
Inventor:
Alfred F. Bischoff,
by Richard E. Hosley
His Attorney.

Patented Dec. 27, 1949

2,492,730

UNITED STATES PATENT OFFICE 2,492,730

ELECTRICAL INDICATING SYSTEM

Alfred F. Bischoff, Ballston Spa, N. Y., assignor to General Electric Company, a corporation of New York Application February 24, 1949, Serial No. 78,192

3 Claims. (Cl. 177—311)

1

This invention relates to electrical devices and more particularly to a flashover indicating device for use with dynamoelectric machines of the commutator type, such as motors or generators, connected in a series electrical network.

When a plurality of dynamoelectric machines are connected in a series electrical network, a flashover of the commutator of one machine often causes the commutators of the other machines also to flash over. Moreover, the time interval between the flashover of the first machine and the remaining machines on the network may be so small as to make it difficult to determine which machine flashed over first.

It is an object of my invention to provide a device which may be applied to a plurality of dynamoelectric machines of the commutator type to indicate which of the several machines has flashed over first.

My invention in general consists of an electrical device comprising a first plurality of electrical transformers, a transient voltage comparison network, a second plurality of electrical transformers and a plurality of thyratron tubes, all cooperating one with the other when electrically connected to a plurality of dynamoelectric machines to indicate which of the several machines was first to flashover.

For a complete understanding of my invention, reference should be had to the following specification and accompanying drawing wherein the single figure is a diagrammatical view of my device as connected to three dynamoelectric machines of the commutator type.

Referring to the drawing, I have shown therein three commutator type dynamoelectric machines 1, 2 and 3 which are assumed to be connected in a series network system, not shown. In such an electrical arrangement a flashover of the commutator of one of the machines is often followed by a flashover of one or more of the remaining machines. Moreover, the rapidity of flashover of the remaining machines is usually such that it is difficult to determine which of the machines initiated the flashover.

To eliminate this difficulty in accordance with my invention, I provide an electrical flashover indicating device 4 comprising a first plurality of electrical transformers 5, 6 and 7, a transient voltage comparison network 8, a second plurality of electrically interconnected transformers 15, 16 and 17, and a plurality of electrically interconnected thyratron tubes 18, 19 and 20.

In operation voltages are taken from machines 1, 2 and 3 and impressed upon respective transformers 5, 6 and 7 which transformers impress their output voltages on the transient voltage comparison network 8 comprising three rectifying elements 9, 10 and 11 similar to bridge type rectifiers and having respective resistances 12, 13 and 14 electrically connected therein as shown. Network 8 either produces no current or produces rectified currents depending upon the input voltages received by the network. The rectified currents when produced are passed to the primary windings of transformers 15, 16 and 17 in magnitudes and directions depending upon the sources from which network 8 receives its voltage, and the magnitude of the voltages received. Transformers 15, 16 and 17, in response to the currents received from network 8, initiate the discharge of one of the thyratron tubes 18, 19 or 20 depending upon which machine has flashed over first. When a discharge is initiated in one of the tubes, current is drawn through a relay 21 which operates a flash indicator light 22. For example, thyratron tube 19 is operated if machine 2 flashes over first and the flash indicator light 22 is energized. The operator will then inspect the tubes 18, 19 and 20 and the operating glow from tube 19 will indicate to the operator that machine 2 was the first machine to flash over. The remaining thyratron tubes 18 and 20 are prevented from operating when machines 1 and 3 subsequently flash over by an arrangement which will be explained later.

As shown in the drawing, the primary windings 23, 24 and 25 of respective transformers 5, 6 and 7 are respectively connected to the commutators 26, 27 and 28 of respective machines 1, 2 and 3 through the medium of brushes 29 on each machine and coupling capacitors 30. Coupling capacitors 30 may be omitted, if desired, and peaking transformers used instead of the input transformers 5, 6 and 7. In order to decrease the input voltage to the primary windings 23, 24 and 25 and thereby to avoid undesirable operation of device 4 for normal transient voltages in machines 1, 2 and 3, a gang type input attenuator 31, having a resistance 32 in series with each of the primary windings 23, 24 and 25, is provided. The secondary windings 33, 34 and 35 of respective transformers 5, 6 and 7 are electrically connected respectively to rectifying elements 9, 10 and 11 of the transient voltage comparison network 8. Rectifiers 9, 10 and 11 are electrically interconnected by conductors 36 and 37 and are respectively electrically connected to one end of primary windings 38, 39 and 40 of respective transformers 15, 16 and 17. The other ends of primary windings 38, 39 and 40 are electrically interconnected by conductors 41 and 42 which are connected to a ground 43. One end of each of the secondary windings 44, 45 and 46 of respective transformers 15, 16 and 17 is connected to a ground 48. The other ends of each of the secondary windings 44, 45 and 46 are connected respectively to control grids 49, 50 and 51 of thyratron tubes 18, 19 and 20 through respective coupling capacitors 52, 53 and 54 to provide a means for initiating a discharge of the thyratron tubes. Rectifiers 55, 56 and 57 are connected across respective secondary windings 44, 45 and 46, as shown in the drawing, for a purpose which will be explained later. The anodes 58, 59 and 60 of respective thyratron tubes 18, 19 and 20 are electrically interconnected and supplied with electrical power from the positive line 61, of a direct current source through resistance 62 and relay 21. The electrical interconnection of anodes 58, 59 and 60 forms a part of my invention which part will be explained in detail later. The cathodes 63, 64 and 65 are electrically connected in a conventional manner, to a ground 66 which is also the negative terminal of the positive source 61. The control grids 49, 50 and 51 are biased by respective adjustable resistances 67, 68 and 69 which are connected between the anodes 58, 59 and 60 and a negative power source 70. Thyratron tubes 18, 19 and 20 are provided respectively with the usual shield grids 71, 72 and 73 connected to ground 66 in a conventional manner.

Considering the operation of flashover device 4 as applied to machines 1, 2 and 3 and assuming a normal operating condition in which the voltages of the machines are substantially constant, in this case the coupling capacitors 30 retain their normal charge and no current flows in the primary windings 23, 24 and 25 of respective transformers 5, 6 and 7 and therefore the flashover device 4 remains inoperative.

Next considering a condition wherein there is a uniform increase or decrease in voltage in each of the machines 1, 2 and 3, in this case the charging or discharging of capacitors 30 results in a surge of current in primary windings 23, 24 and 25 of respective transformers 5, 6 and 7 and the production of equal surge voltages by the respective secondary winding 33, 34 and 35 of the same transformers. The equal secondary surge voltages thus produced are applied respectively to the rectifiers 9, 10 and 11 which in turn produce equal opposed voltages on conductors 36 and 37 connecting the rectifiers 9, 10 and 11 and no current flows in the primary windings 38, 39 and 40 of respective transformers 15, 16 and 17. Hence no voltage is induced in the secondary windings 44, 45 and 46 to initiate a discharge in thyratrons 18, 19 and 20. Therefore, the device 4 remains inoperative insofar as thyratron tubes 18, 19 and 20 are concerned and no indication of flashover is given. The current supplied by the secondaries of transformers 5, 6 and 7 is dissipated by flowing through the resistances 12, 13 and 14 of the rectifiers 9, 10 and 11.

Next assuming small unbalanced transient voltage changes in one of the machines 1, 2 and 3, for example machine 2, in this case capacitors 30 connected to machine 2 are charged or discharged to cause surge current to flow in the primary winding 24 of transformer 6, thereby producing an output surge voltage from the secondary winding 34. This output voltage is impressed on bridge rectifier 10 to produce a voltage differential at points X and Y on rectifier 10, the polarity of such voltages being the same for a current surge in either direction of primary winding 24. Considering point X to be positive with respect to point Y and assuming current to flow from positive to negative, then one component of surge current flows from point X through conductor 36, to resistance 12, thence to primary winding 38, back through conductor 41 to primary winding 39, and back through a conductor 74 to point Y. Another surge current flows from point X in a parallel path through conductor 37, resistor 14, a conductor 75, primary winding 40, back through conductor 42 to primary winding 39, and thence through conductor 74 to point Y. A third surge current flows from point X to point Y through resistance 13. The flow of current in the above three paths are indicated by arrows in the drawing. This is, surge current flows in primary winding 39, in an opposite direction to the surge currents in primary windings 38 and 40. Assuming point X on rectifier 10 to be positive with respect to point Y, then transformers 15, 16 and 17 are connected so that a surge of current in a downward direction in primary windings 38, 39 and 40 will cause a voltage negative with respect to ground to be produced by the respective secondary windings 44, 45 and 46, and a surge of current in an upward direction in primary windings 38, 39 and 40 will cause a voltage positive with respect to ground to be produced by the respective secondary windings 44, 45 and 46.

Having assumed point X on rectifier 10 to be positive with respect to point Y and understanding that the polarity at points X and Y remains the same for voltage surges in either direction in primary winding 24, then the resulting surge of current in primary winding 39 of transformer 16 is in an upward direction thus producing a positive voltage from the secondary winding 45 of transformer 16. The positive voltage thus produced is transmitted through coupling capacitor 53 to control grid 50 of thyratron tube 19 thereby tending to initiate a discharge of tube 19. However, the voltage thus applied to control grid 50 of thyratron tube 19 must be sufficient to overcome the negative biasing voltage thereon if a discharge of tube 19 is to be initiated. However, in the case where such voltage is derived from small unbalanced transient voltage changes on machine 2 such a voltage will not be sufficient to initiate a discharge of tube 19 because the input attenuator 31 will be adjusted to diminish such a signal. As regards thyratron tubes 18 and 20, the direction of surge current in windings 38 and 40 of respective transformers 15 and 17 is in a downward direction thereby producing negative voltages in secondary windings 44 and 46 which negative voltages are prevented from reaching control grids 49 and 51 of respective thyratron tubes 18 and 20 by means of respective rectifiers 55 and 57. Such negative voltages are conducted to the ground 48. Therefore, for small unbalanced transient voltages of one machine, device 4 does not indicate a flashover, although some positive voltage is applied to the control grid of one of the thyratron tubes 18, 19 or 20.

Finally, considering the case of a flashover on one of the machines, for example machine 2, then the same operation takes place except for magnitude of voltages and currents in the device. In this case a strong current surge is received from capacitors 30 connected to machine 2 which surge is sufficient to override the effect of input attenuator 31 and a sufficiently strong voltage is applied to control grid 50 to cause thyratron tube 19 to discharge thereby providing a flashover indication.

So far, I have shown an arrangement for initiating the discharge of an electronic tube, such as tube 19, when a flashover occurs on one of the machines, such as machine 2. However, when the remaining machines 1 and 3 flash over, a voltage will likewise be applied to control grids 49 and 51 of thyratron tube 18 and 20, thereby tending to cause these tubes to discharge, and since these subsequent flashovers normally occur within a fraction of a second from the time of the first flashover, there would not be sufficient time for the operator to observe which tube first operated. I, therefore, provide an electrical arrangement of thyratron tubes 18, 19 and 20 wherein the remaining tubes are prevented from operating after the first tube has operated, regardless of the flashover of other machines. In this arrangement the anodes 58, 59 and 60 of respective thyratron tubes 18, 19 and 20 are electrically interconnected as previously described. As so connected, when tube 19 begins discharge its internal impedance is thereby reduced and the voltage on the anodes 58, 59 and 60 decreases to a fraction of its previous value. The decreased voltage across tube 19 is sufficient to continue its discharge because the internal resistance of a thyratron tube is low after discharge is initiated, but the decreased voltage is not sufficient to initiate a discharge of tubes 18 and 20. Moreover, in addition to the reduction of the anode voltage of tubes 18, 19 and 20 below a value necessary to initiate a discharge of these tubes, the negative voltage applied to the control grids 49, 50 and 51 of respective tubes 18, 19 and 20 is simultaneously made more negative. That is, since the anode voltage which is reduced by discharge of tube 19 is the positive voltage on the adjustable grid resistors 67, 68 and 69 and since the negative potential supplied from line 70 to the grid resistors is maintained constant, there is a change of control grid voltage to a greater negative value. This increase in negative voltage on the control grids of tubes 18 and 20 forms a further impediment in addition to the lower anode voltages of tubes 18 and 20 preventing the initiation of a discharge of these tubes. Therefore, only tube 19 remains operating thereby indicating a flashover of machine 2.

Another problem remains with respect to the operation of tubes 18, 19 and 20 in that the discharge of capacitors 30 occurs in a very short period of time causing a voltage of very steep wave front to be applied to the primary winding 39 of transformer 16. The transient response of the transformer will produce a voltage in the transformer secondary 45, of the type $$e\text{sec.} = \frac{R_2}{R_1+R_2}\left(1-e^{-\alpha t}\frac{\alpha}{\beta}\sin \beta t - e^{-\alpha t}\beta t\right)$$

where $e$sec. is the secondary voltage, $R_1$ is the primary source resistance, $R_2$ is the load resistance, $t$ is time and $\alpha$ and $\beta$ are constants depending upon $R_1$, $R_2$, the leakage reactance and the equivalent secondary capacity.

From the equation, it can be seen that this is a decremental sinusoidal type wave oscillating about the value of the non-transient output of the transformer secondary and decreasing in amplitude at an exponential rate until it approaches the non-transient output value.

Thus the immediate response, i. e. where $\beta t$ varies from 0 to $\pi$, of the secondary winding 45 of transformer 16, to the steep wave applied to the primary winding 39 would be a voltage wave having a positive value which wave is then followed by a voltage wave having a negative value of somewhat decreased amplitude, the decrease depending upon the parameters in the equation above. The voltage wave having a negative value is undesirable, as it may cause tube 19 to deionize and thus remove the visual indication of flashover before it is noted. However, in considering the application of rectifiers 55, 56 and 57 to the secondaries of respective transformers 15, 16 and 17, it was pointed out that all negative voltages are conducted to ground 48 and do not reach control grids 49, 50 and 51. The effect of rectifiers 55, 56 and 57 is such as to modify the above equation by making $R_2$, $\alpha$ and $\beta$ a function of time in such a manner as to cause the wave to decay much more rapidly and yet not influence the initial positive amplitude. Therefore, the voltage wave having a negative value following the positive discharge initiating wave is very small and insufficient to cause tube 19 to deionize.

It will be noted, however, that the surge of currents in primary windings 38 and 40 is in an opposite direction to the surge of current in winding 39. Thus, during the period immediately after the surge, the control grids of tubes 18 and 20 would be supplied with a negative voltage except for the damping due to rectifiers 55 and 57 which are connected across the secondary windings 44 and 46 of transformers 15 and 17. By providing rectifiers 55 and 57 the damping parameters in the above equation are made very large so that the positive wave occurring during the period when $\beta t$ varies from $\pi$ to $2\pi$, i. e. the period immediately following the negative wave, is very much decreased in amplitude and insufficient to cause tubes 18 and 20 to discharge. The decay of the flashover transient surge current applied to the primaries 38, 39 and 40 of transformers 15, 16 and 17 is at a much lower rate than the initial rise of current and its effect is therefore a positive voltage of insufficient amplitude to cause grids 49 and 51 to initiate a discharge of respective tubes 18 and 20. Therefore, the decay of surge currents in primary windings 38 and 40 will not cause tubes 18 and 20 to discharge.

To reset device 4, the operator may interrupt the discharge of tube 18, 19 or 20 by momentarily pressing a reset button 76 which electrically connects the anodes 58, 59 and 60 to ground 66, as shown in the drawing. Upon release of reset button 76, device 4 is again ready for operation in response to a flashover on one of the machines.

A resistance 77 and capacitor 78 may be connected in parallel across each of the primary windings 38, 39 and 40 of transformers 15, 16 and 17, if desired, to eliminate electrical noise.

I have, therefore, provided a flashover indicating device for use with commutator type dynamoelectric machines connected in a series network, which device is capable of indicating which of a plurality of electrical machines connected thereto was first to flashover.

While I have shown and described a particular embodiment of my invention, it will be obvious to those skilled in the art that various changes and modifications may be made without departing from my invention in its broader aspects, and I therefore, aim in the appended claims to cover all such changes and modifications as fall within the true spirit and scope of my invention.

What I claim as new and desire to secure by Letters Patent in the United States is:

1. An electrical device for use with a plurality of dynamoelectric machines of the commutator type, said device comprising a first plurality of transformers electrically connected one to each of said machines and each responsive to a voltage change across the armature of the machine to which it is connected, a transient voltage comparison network electrically connected to said first plurality of transformers and arranged to produce different output voltages dependent upon the voltages received from said first plurality of transformers, a second plurality of electrically interconnected transformers electrically connected to the output of said transient voltage comparison network and arranged to produce voltages responsive to the output voltages of said transient voltage comparison network, and a plurality of electrically interconnected grid biased thyratron tubes, said tubes having control grids electrically connected to the secondary windings of said second plurality of transformers, said tubes being arranged to prevent the remainder of said tubes from operating after one tube has operated, and means for grounding the negative voltages of said secondary windings of said second plurality of transformers to provide only positive signal voltage on said control grids of said electronic tubes, whereby upon a flashover of the commutator of one of said machines a visual signal is provided indicating which of the machines was first to flashover.

2. An electrical device for use with a plurality of dynamoelectric machines of the commutator type, said device comprising a first plurality of transformers electrically connected one to each of said machines and each responsive to a voltage change across the armature of the machine to which it is connected, a transient voltage comparison network electrically connected to said first plurality of transformers and arranged to produce different output voltages dependent upon the voltages received from said first plurality of transformers, said comparison network comprising a plurality of electrically interconnected rectifiers, each of said rectifiers being connected to a different one of said first plurality of transformers, a second plurality of electrically interconnected transformers electrically connected to the output of said transient voltage comparison network and arranged to produce voltages responsive to the output voltages of said transient voltage comparison network, and a plurality of electrically interconnected grid biased thyratron tubes, said tubes having control grids electrically connected to the secondary windings of said second plurality of transformers, said tubes being arranged to prevent the remainder of said tubes from operating after one tube has operated, and means grounding the negative voltages of said secondary windings of said second plurality of transformers to provide only positive signal voltage on said control grids of said electronic tubes, whereby upon a flashover of the commutator of one of said machines a visual signal is provided indicating which of the machines was first to flashover.

3. An electrical device for use with a plurality of dynamoelectric machines of the commutator type, said device comprising a first plurality of transformers electrically connected one to each of said machines and each responsive to a voltage change across the armature of the machine to which it is connected, a transient voltage comparison network electrically connected to said first plurality of transformers and arranged to produce different output voltages dependent upon the voltages received from said first plurality of transformers, a second plurality of electrically interconnected transformers electrically connected to the output of said transient voltage comparison network and arranged to produce voltages responsive to the output voltages of said transient voltage comparison network, and a plurality of electrically interconnected grid biased thyratron tubes, the control grids of said tubes being electrically connected to the secondary windings of said second plurality of transformers, the anodes of said tubes being electrically interconnected to reduce the anode voltage on the remaining tubes after discharge has been initiated in one tube thereby preventing operation of the remaining tubes, and means grounding the negative voltages of said secondary windings of said second plurality of transformers to provide only positive signal voltage on said control grids of said tubes, whereby upon a flashover of the commutator of one of said machines a visual signal is provided indicating which of the machines was first to flashover.

ALFRED F. BISCHOFF.

REFERENCES CITED

The following references are of record in the file of this patent:

UNITED STATES PATENTS

| Number | Name | Date |
| --- | --- | --- |
| 2,057,531 | Livingston | Oct. 13, 1936 |
| 2,130,411 | Bedford | Sept. 30, 1938 |